United States Patent [19]

Pauliukonis

[11] 4,441,687
[45] Apr. 10, 1984

[54] O-RING SOLENOID VALVE

[76] Inventor: Richard S. Pauliukonis, 6660 Greenbriar Dr., Cleveland, Ohio 44130

[21] Appl. No.: 264,058

[22] Filed: May 15, 1981

Related U.S. Application Data

[62] Division of Ser. No. 972,287, Dec. 22, 1978.

[51] Int. Cl.$^3$ ............................................. F16K 31/06
[52] U.S. Cl. .................................. 251/139; 251/141; 251/DIG. 1
[58] Field of Search ................ 251/141, 129, DIG. 1, 251/139

[56] References Cited

U.S. PATENT DOCUMENTS

| | | | |
|---|---|---|---|
| 2,966,168 | 12/1960 | Hunt et al. | 251/139 X |
| 3,023,777 | 3/1962 | Collins | 251/139 X |
| 3,485,417 | 12/1969 | Cocks | 251/139 X |

*Primary Examiner*—Arnold Rosenthal
*Attorney, Agent, or Firm*—R. S. Pauliukonis

[57] ABSTRACT

A drastically simplified directional solenoid valve with top fluid inlet and bottom fluid exhaust ports employs a conventional electrical bobbin coil with a solenoid iron conveniently secured thereto in line with a simplified axially movable solenoid plunger in an operable relationship with a simple seal at the exhaust port, preferably of O-ring configuration, between a first plunger engaged position inside the seal to maintain valve normally closed when the solenoid coil is not energized electrically and a second position with plunger retracted from the seat of the seal when the coil is electrically energized turning said iron into a magnet with pull force capable of lifting the plunger from the seat to render valve open to exhaust while the plunger is being held against the iron until the coil becomes de-energized at which time the plunger is automatically shifted back to the first valve closed position against the seat by either the drag forces fluid flow provides or by additional biasing force of a compression spring acting over the plunger constantly downward, the plunger, the coil and the O-ring seal in combination comprising a simple flow control means through the valve axially from the top inlet to the bottom exhaust.

3 Claims, 3 Drawing Figures

O-RING SOLENOID VALVE

This is a division of application Ser. No. 972,287, filed Dec. 22, 1978.

This invention relates to solenoid valves generally and to directional valves of 2-way design specifically, requiring simple flow controls with improved reliability and reduced costs, such as used for the control of fluids in many chemical processes, food and drug industries, instrumentation and research apparatuses, water treatment, pollution control, solar and specialty equipment or the like.

It is a known fact that using conventional approach to the valve design, a consideration must always be given to the cost of the solenoid operators which as a rule represent a major expense. This is so because all present operator designs are identical, and basically quite complicated. For example, most plungers of such solenoid operators are provided with rubber inserts with or without spring cushions to insure better sealing against quite elaborated valve seats. Further, nearly without exception, the existing solenoid operators use carefully welded together guide tube assembly with an iron comprising a top portion while connected to a transition tube, by rule non-magnetic, and terminating at the bottom with a large boss, over which an expensive valve housing with costly side ports is secured.

The principle object of this invention is therefore to simplify the design of such solenoid operators, in particular as it relates to the solenoid valves. Further object of this invention is to simplify plunger design for reduced fabrication cost. Another object of this invention is to eliminate valve housing of the present design completely, in particular in valves with atmospheric exhaust.

Devices of this type which require fewer components for valve construction and operation are obviously desirable, in particular if they can save costs.

These and other objects and advantages of the invention will become more fully apparent from the following description of the embodiment of the invention, taken together with the accompanying drawings:

IN THE DRAWINGS

Figure 1:
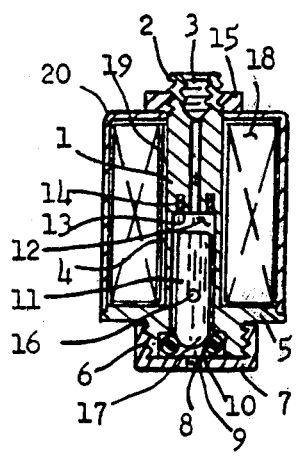
FIG. 1 is a cross-sectional view of a solenoid valve which essentially is a conventional valve operator without a valve housing which is replaced by a simple cup of the present invention, including O-ring seal placed therein.

As can be seen from FIG. 1, this simple valve includes a conventional guide tube assembly 1 comprising of an iron 2, with a central flow opening 3 passing therethrough, secured permanently to a short non-magnetic thin tube 4 which terminates with a permanently secured enlarged boss 5 provided with a threaded external end 6 which is covered by a cup 7 with a hole 8 so as to close tube open end provided with a counterbore 9 adaptable to receive an O-ring seal 10 after a solenoid plunger 11 is slidably received inside tube cavity 12 under the iron flat end 13 shown to retain shading ring 14 normally used with alternating current for supplementing current fluctuations. As can be seen from the FIG. 1, plunger 11 is nothing more than a plain piece of elongated ferritic metal slidably movable axially between the seal 10 and the end 13 of iron 2 except for a central fluid passage 16 and a contoured end 17 in contact with seal 10 plunger 11 entails.

A bobbin coil 18 of appropriate electrical rating in power requirements having a central opening 19 slightly larger than the outside diameter of the tube 4 is shown simply assembled over the guide tube assembly 1, covered by a thin metallic cover 20 and secured in place by a top nut 15 completing the assembly of the solenoid valve of FIG. 1.

Unlike in conventional valves with complicated and costly valve housings in place of simple cup 7 of FIG. 1, the fluid flow starts from the top through central opening 3 of iron 2 and exits at the bottom through the cup hole 8 instead of side holes of conventional valve housings. In the illustrated case of FIG. 1 the valve is shown to be in a first normally closed position wherein the fluid when entered through the iron opening 3 is maintained inside the valve proper to significantly aid in valve sealing due to a pressure force fluid exerts over the exposed surfaces of the plunger which is in effect forced into the O-ring seal to stay bubble tight shut therein until the solenoid coil 18 becomes electrically energized. When coil 18 is electrically energized, the ampere turns therein generated develop a magnetic force in the solenoid iron 2 capable of pulling plunger 11 away from the seat of O-ring seal 10 and lifting it up toward the iron face 13 thereby rendering valve open and the plunger shifted to a second position while the flow is allowed to continue from the top iron opening 3 via central fluid passage 16 of plunger 11 into the bottom exhaust port 8 of the cup 7 until coil 18 becomes de-energized electrically at which time the magnetic pull force disappears and the plunger 11 becomes dragged-in back into the seal 10 by fluid flow drag forces prevailing to eventually close the exhaust port 8 shut and stabilize itself in first valve normally closed position with fluid force maintaining the conditions bubble tight thereafter and until the cycle is repeated.

Figure 2:
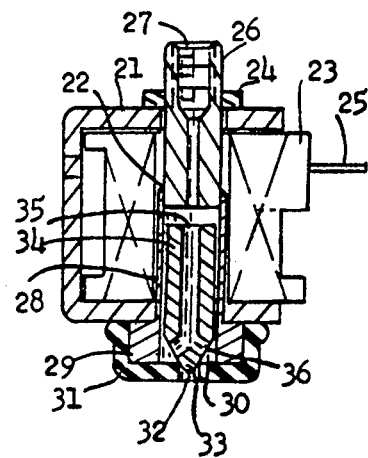
FIG. 2 is a cross section of a simple solenoid valve which employs a simple rubber cup instead of conventional valve housing and a yoke to further simplify such valves.
Figure 3:
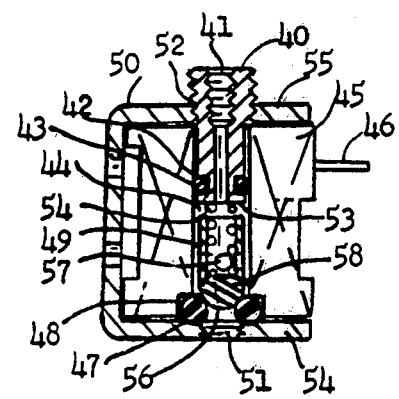
FIG. 3 is a cross section of a solenoid which dispenses with the guide tube assembly of conventional design completely and employs simple yoke to retain valve seal therein in ultimate simplification of solenoid valves.

It is to note here that because of simplification of the plunger with seal and of the flow pattern described above this valve becomes totally different from the valves in existance in many other ways as well. For example, due to the flow pattern sideways in the conventional valves the plunger rarely is subject to advantageous drag forces fluid exerts over the plunger when it is in the second position. In turn, most plungers of conventional solenoid operators must have spring returns to facilitate plunger return to the first valve normally closed position. Obviously working against a plunger spring the valve must utilize more electric power, and therefore the coil ratings must be larger than those employed with the valve of the present invention as shown in FIG. 1 and FIG. 2 thereby saving electricity, in particular if such valve is of continuous duty, unless the application involves very low fluid flows with insufficient or marginal drag forces to automatically close the valve and return the plunger to said first position, at which time a compression spring may be employed for plunger return as is shown in FIG. 3 wherein plunger is provided with a central fluid counterbore large enough to also accomodate said spring. In any case, such a spring does not have to be rated as highly as the springs are in conventional valve operators because of the existance of drag forces fluid provides in the designs depicted in all three figures above, ultimately helping to save energy due to less spring force requirements. Finally, the design wherein O-ring serves as valve seat such as shown in FIGS. 1 and 3 offers larger flow coefficient ratings in both fluid inlet and exhaust ports. The same pertains to the design shown in FIG. 2 wherein in lieu of the O-ring a rubber cup is employed with equal success. This is so, because the basic design principle of the present invention is different allowing more flexibility in pressures since they never act from the bottom on the plunger. Whereas most conventional solenoid valves have fluid passages in valve housings rather than in solenoid iron of present design, the fluid entering side port of conventional housing must be directed to the center thereof for exiting usually under the plunger with associated spring. The higher the pressure, the larger the spring force is a must in conventional valves. Further, since springs are limited in size, their deflection is associated with spring force increase, all of which leads to the point that for each specific volume of the fluid flow under a specific pressure there is a different valve with different coil ratings, different springs and, in fact, valve overall sizes, unavoidable in conventional designs, unlike the design of this invention wherein a considerably greater flexibility is evident and self-explanatory to those skilled in the art of making and using solenoid operated valves, in accordance with the teachings above.

Turning back to the drawings, the description will follow by reference to FIG. 2. As can be seen from FIG. 2 the only difference there is between FIG. 1 and FIG. 2 is in the seal and the coil retainer which in FIG. 2 is a yoke 21 of C-clamp configuration in lieu of metallic cover 20 shown in FIG. 1.

As in FIG. 1 there is an identical guide tube assembly 22 in FIG. 2, including a similar solenoid coil 23 permanently secured over the tube assembly 22 by a top nut 24, except that the coil here is encapsulated and provided with strong permanent tabs 25 representing electrical terminals. An elongated solenoid iron 26 with a central coaxial top fluid passage 27 is shown in FIG. 2 secured permanently to a short non-magnetic thin tube 28 which terminates with a slightly enlarged boss 29 and an open tube end 30 which is closed by a rubber cup 31 snugged over the boss 29 and adaptable to be either permanently secured thereto by adhesive or simply retained over it by elastic force elastomers, like rubber, entail, depending on the pressures to be controlled by this valve in service. Inside of cup 31 there is a central exhaust port 32 shown to be closed by a contoured end 33 of a plunger 34 disposed axially inside the tube 28 in an operable relationship with the solenoid iron 26. Surely, it will be recognized that when plunger 34 is in shown first valve normally closed position, the valve can be sealed as succesfully against the cup opening 32 in FIG. 2 as it was sealed in FIG. 1 against the O-ring which replaced conventional plunger insert which as a rule is also made from elastomer such as rubber. Obviously, the design of FIG. 2 offers cost advantage over design of FIG. 1 in that the cost of the O-ring, regardless how small, can be eliminated since the rubber cap of FIG. 2 serves dual purposes more economically. Further, additional advantages can easily be detected by the fact that the plunger 34 here is also made from stock of elongated ferritic material by cutting one end flat while the other end thereof is contoured by a taper 33 to facilitate a better seal against the edges of the exhaust port 32 of cup 31.

The valve of FIG. 2 operates exactly like that described when discussing FIG. 1 with fluid flow initiating from supply opening 27 at the top of iron 26 to continue downward to exit through exhaust port 32 passing through clearances between the plunger outside diameter and tube inside diameter as well as a central plunger opening 35 shown to be coaxial with opening 27 of iron 26 passing inwardly along the plunger length from the flat plunger end to exit at 36 of the taper thereof, short of exhaust port 32 of cup 31, when the solenoid coil is electrically energized shifting plunger 34 into the second valve open position. De-energization of coil 23 eliminates said magnetic force of iron 26 and allows automatic return of the plunger to the first valve closed position by said drag force, flow of the fluid constantly exerts over plunger 34, rendering valve closed and sealed tight by the fluid pressure force in accordance with the preceding description.

Although the drawings of FIG. 1 and FIG. 2 identify typical 2-way directional valves, it should be clearly understood that the basic design principle shown and described is in no way limited thereto. Simple modifications in cup of both FIGS. 1 and 2 may be made converting these valve from 2-way to 3-way and diverter designs without departing from the spirit of the invention. For example, cup 7 of FIG. 1 may be elongated slightly providing more material for threads to facilitate exhaust piped when port 8 is provided with threaded fittings. Boss 5 of FIG. 1 may be made twice as long as that shown providing room for a side port needed for 3-way normally open valve or a diverter while eliminating central fluid passages 16 from plunger 11 altogether to allow closing of fluid supply port 3 when the solenoid coil is electrically energized and the plunger is in the second valve open position permitting fluid communication between said side port and said fluid exhaust port and thereby satisfying flow pattern of a typical 3-way valve that may also serve as a diverter. Perhaps a most significant design modification pertains to a 2-way valve shown in FIG. 3 identifying least costly O-ring solenoid valve of this invention.

As can be seen from FIG. 3 the O-ring valve that represents ultimate in simplicity looks similar to the valve shown in FIG. 2 and in fact operates exactly as valves shown and described when discussing FIGS. 1 and 2.

The only difference between valve of FIG. 3 and those shown in FIG. 1 and FIG. 2 is that there is no guide tube assembly in FIG. 3. Instead, a solenoid iron 40 with identical fluid port 41 passing centrally therethrough internally is provided with an external groove 42 for housing an elastomer seal 43 permanently placed therein to insure that the fluid entering inside bore 44 of encapsulated bobbin coil 45 with tabs 46 and O-ring elastomer seal 47 in an appropriate counterbore 48 at the bottom thereof is maintained identically as it was retained inside tubes 4 and 28 of FIG. 1 and FIG. 2 sealed when a plunger 49 of FIG. 3 is in a first valve normally closed position.

This is possible because the manufacture of such encapsulated coils provides, at practically no cost, smooth protective coatings inside the opening of the bobbin serving as plasticly lined bores adequately protected against fluid effect thereto. Many such plastic liners are serving chemical industry as the most suitable containers for various corrosive fluids. Further, the small counterbore 48 at the bottom of coil 45 for housing the O-ring seal 47 is also provided for free, so to speak, because in the coil manufacture and encapsulation, such provisions are common. In fact, there are bobbin coils on the market with similar resets at the bottom thereof used for other purposes than a simple insertion of O-ring as shown in FIG. 3 of the present invention.

A yoke 50 again of C-clamp configuration embrasing both ends of the coil 45 of FIG. 3 can have both opposing ends thereof with alignment holes 51 and 52 respectively threaded, thereby facilitating not only an easy assembly of the coil 45 sideways, pre-assembled with plunger 49 which is retained inside bore 44 by seal 47, but also a simple securing thereof in the yoke 50 after alligning holes 51 and 52 respectively with bore 44 of coil 45 by threading iron 40 from the top down until it bottoms therein, completing valve assembly for valve operation in a fashion already described. Obviously, the design of FIG. 3 can not be used with high pressures which, acting over the flat iron end 53 and the surfaces of plunger 49, induce rather large opposing forces to the yoke ends 54 and 55 respectively which at a certain point may become overstressed and may eventually spread apart, with subsequent loss of fluid, if one cares to exaggerate a bit. Fundamentally, therefore the design of FIG. 3 is limited to low pressures such as those prevailing in fluidics industry and many other process and laboratory applications often handling very low fluid flows. In turn, drag forces of limited fluid flow may indeed be marginal necessitating the use of a biasing force of a compression spring 54 lodged between the flat face 53 of iron 40 and a counterbore end 56 of the plunger 49 with an opening 57 for fluid flow therethrough, adjacent contoured plunger end 58.

Without exception, the designs depicted in FIGS. 1,2 and 3 identify the most simple design of the solenoid valves in general and of the O-ring solenoid 2-way valves in particular, which employ in combination with simple O-ring seal a flow pattern which initiates from the iron top to be exhausted at the bottom through essentially inside diameter of the most simple seal, thereby satifying the objectives set forth for this invention completely.

What is claimed is:

1. A solenoid operated valve comprising:
a valve, housing a coaxial solenoid coil peripherally, includes a conventional guide tube assembly comprising an iron at the top thereof with a central flow opening passing therethrough, secured therein permanently to a short non-magnetic thin tube section which terminates at the bottom end thereof with a permanently secured enlarged boss provided with a counterbore which houses O-ring seal while leading to a bottom open end of said guide tube assembly which is closed by an end cup having a central fluid port provided therein, including a central passage in said guide tube assembly for fluid flow therethrough between a first top end of said valve provided with said iron and adaptable of serving as a fluid supply port means and a second bottom end wherein said end cup serves as an exhaust port means, and said O-ring seal serving as a valving means thereof, a ferritic solenoid plunger of an elongated configuration spaced inside said guide tube assembly so as to be movable between said top iron and said bottom O-ring axially and positioned so as to have a first top plunger end face said first top end of said valve while an opposite second end thereof being contoured maintains valve in a first normally closed position preventing fluid flow therethrough by said second plunger end which is seated against said O-ring for peripheral plunger sealing on seal portion exposed thereto when said plunger is forced by the prevailing fluid drag forces to assume said first valve normally closed position until said solenoid coil becomes energized electrically, an when said solenoid coil is energized, a strong magnetic pull force generated therein lifts said plunger from said O-ring seal upwards against said iron to permit fluid flow between said fluid supply and exhaust port means comprising a second valve open position for as long as said solenoid coil is energized electrically, while when said solenoid coil is de-energized electrically, said magnetic force disappears permitting an automatic plunger return by said fluid drag forces to said first valve normally closed position, and vice versa.

2. A solenoid operated valve as in claim 1 wherein said second plunger end is tapered and capable of an automatic centering inside said coaxial seal to provide a bubble tight valve closure means for as long as said solenoid coil is de-energized.

3. A solenoid operated valve as in claim 1 wherein said plunger is provided with a central large diameter bore entering said first plunger end partway toward said second plunger end which remains blind and exiting perpendicularly through a side wall by way of a plurality of smaller holes adjacent said second plunger end which also is contoured and capable of centering inside said coaxial seal to provide a bubble tight valve closure means for as long as said solenoid coil is de-energized and when said solenoid coil becomes electrically energized, said plunger becomes lifted by said magnetic force therefrom to permit fluid flow between said fluid supply and exhaust port means via said plunger bore and said smaller side holes.

* * * * *